United States Patent Office 3,309,253
Patented Mar. 14, 1967

3,309,253
PROCESS FOR SECURING CONNECTION BE-
TWEEN TWO SOLID SURFACES BY MEANS
OF A POLYDIMETHYL SILOXANE
Karl Schnurrbusch Cologne-Flittard, and Walter Noll,
Leverkusen, Germany, assignors to Farbenfabriken
Bayer Aktiengesellschaft, Leverkusen, Germany, a corporation of Germany
No Drawing. Filed May 2, 1962, Ser. No. 191,710
Claims priority, application Germany, May 6, 1961,
F 33,881
6 Claims. (Cl. 156—92)

The invention relates to a process for securing connection between two solid surfaces by means of a polydimethyl siloxane of very high viscosity. Although the flowability of such adhesives requires the additional use of solid mechanical members, the adhesive is capable of absorbing short-term action of force due to the viscoelastic property of the siloxane layer. Moreover, such an adhesive is also suitable for connecting the aforesaid solid mechanical members themselves such as screws, bolts, tacks, and clamps, and thus to ensure them against loosening caused by shock or vibration without the releasability of such compounds being lost.

Especially for the last-mentioned case, the extremely high viscosity of the adhesive involves the difficult task to coat the screws and the like with this adhesive.

Since the use of a solvent has been found to be detrimental for the adhesion effect, it has already been proposed to embed the aforesaid solid mechanical members to be coated in a greater amount of viscous polydimethyl siloxane, and then to separate the excess in a screening separator. It is obvious that such a process is seldom applicable, especially when small heaped objects are to be treated which retain considerable quantities of excess adhesive in the interstices and stick together upon storage, moreover, such a process necessitates great expenditure in the form of separating devices.

It has now been found that these difficulties may be overcome by applying to the solid mechanical members, instead of the high polymeric siloxane, a mixture of a readily flowing polydimethyl siloxane having less than 100,000 cst. viscosity, and a portion of between 0.1 and 5 percent by weight of a polymerisation catalyst active at room temperature. According to the invention the mixture is prepared, shortly before use, by simple stirring.

The siloxanes to be used for this purpose and known per se may be linear $\alpha,\omega$-dihydroxy-polydimethyl siloxanes or permethyl-cyclopolysiloxanes. Though it is possible to replace the methyl groups by other groups, this is not of substantial advantage. A portion of trifunctional siloxane units which may still be present from the production of the polysiloxane has to be as small as possible since with an increasing content of such units there are increasingly formed branched and ultimately cross-linked high polymeric siloxanes which impair the releasability of the adhesive. For the further siloxane polymerisation or condensation at room temperature, a number of known catalysts are available among which the following may be mentioned: sulphuric acid, which may also contain $SO_3$, phosphorus compounds, hydrogen chloride, organochlorosilanes, carboxylic acid halides, fuller's earth, iron chloride and other Lewis acids. In general, it is not necessary to pay any attention to the question of corrosion with respect to the surfaces to be joined because of the negligibly small amounts of catalyst. The catalyst may be added in substance, but also on finely divided carrier substances or in admixture with fillers which may or may not have a strengthening effect, or any other additives. It is also possible to use several of such catalysts concurrently.

The mixture is applied by known methods such as brushing, spraying, dipping, to the parts to be connected; connection may take place at any time in the manner intended for each case. In accordance with the consistency most suitable for the application, a viscosity of the siloxane to be employed is chosen which is not critical for the polymerisation process. In the course of a period of time depending upon the type and quantity of the catalyst, the transformation of the siloxane into the high molecular state takes place in situ so that a viscosity in the order of magnitude between $10^6$ and $10^8$ cst. results.

As known, the solid surfaces thus connected and bonded can be separated from one another by persistent action of force, and can be rejoined with the same effect without any further treatment, but do not automatically loosen by vibration shock or impact. The application of the adhesive by the method according to the invention requires no special apparatus and can, therefore, be carried out in any desired manner on the spot and in the simplest way.

The following examples are given for the purpose of illustrating the invention.

Example 1

100 g. of a polydimethyl siloxane of the formula $HO[Si(CH_3)_2O]_xH$, the mean polymerisation degree $x$ of which corresponds to a viscosity of about 18,000 cst., are mixed with 0.1 g. of dimethyl-dichlorosilane. The following viscosity increase occurs at room temperature:
After standing for:

2 hours to 50,000 cst.
5 hours to 130,000 cst.
24 hours to 280,000 cst.
120 hours to 700,000 cst.
1 week to 1,000,000 cst.
4 weeks to 2,700,000 cst.
8 weeks to 4,500,000 cst.

Example 2

100 g. of a polydimethyl siloxane of the formula $HO[Si(CH_3)_2O]_xH$, the mean polymerisation degree $x$ of which corresponds to a viscosity of 1000 cst., are mixed with 0.5 g. of sublimed ferric chloride. The following viscosity increase occurs at room temperature:
After standing for:

24 hours to 3,200,000 cst.
120 hours to 4,500,000 cst.
4 weeks to 15,000,000 cst.

Example 3

100 g. of octamethyl-cyclotetrasiloxane are mixed with 3 g. of a sharply dried fuller earth and subsequently completely dehydrated with dimethyl-dichlorosilane. The following viscosity increase occurs at room temperature:
After standing for:

17 hours to 60,000 cst.
48 hours to 6,000,000 cst.
1 week to 11,000,000 cst.

Example 4

100 g. of titanium dioxide (Anatas) are charged at room temperature with 10 g. acetyl chloride. 8 g. of this charged titanium dioxide are stirred into 100 g. of the same polydimethyl siloxane as in Example 1. The following viscosity increase occurs at room temperature:

After standing for:

24 hours to 35,000 cst.
48 hours to 50,000 cst.
1 week to 3,000,000 cst.
2 weeks to 7,000,000 cst.

We claim:
1. In a process for securing connections of two solid surfaces against relative movement under conditions of shock and sudden vibration by means of an extremely viscous polydimethyl siloxane, the step which comprises producing the latter in situ by applying a mixture consisting essentially of a readily flowing polydimethyl siloxane of a viscosity of less than 100,000 cst. at 20° C. selected from the group consisting of $\alpha,\omega$-dihydroxy-polydimethyl siloxanes and permethyl-cyclopolysiloxanes, and a portion of between 0.1 and 5 percent by weight of a catalyst for polymerization of said readily flowable polydimethyl siloxane, active at room temperature, to at least one of said surfaces, and thereafter connecting said surfaces.

2. Process according to claim 1, wherein a filler substance is added to said mixture of polydimethyl siloxane and catalyst.

3. In the method for securing a connection of two solid surfaces against relative movement under conditions of shock and sudden vibration by means of an extremely viscous polydimethyl siloxane, the step which comprises producing the latter in situ by mixing siloxane consisting essentially of polydimethyl siloxane of a viscosity of less than 100,000 cst. at 20° C. selected from the group consisting of $\alpha,\omega$-dihydroxy-polydimethyl siloxanes and permethyl-cyclopolysiloxanes, and a portion of between 0.1 and 5 percent by weight of a polymerization catalyst for said polydimethyl siloxane and active at room temperature, applying the mixture thus obtained and while the viscosity of the polydimethyl siloxane is as aforesaid, to at least one of said surfaces to be connected and thereafter connecting said surfaces, whereby polymerization to said extremely viscous polydimethyl siloxane occurs in situ on at least one of the surfaces to be joined.

4. Process according to claim 3, said catalyst being selected from the groups consisting of sulfuric acid, $SO_3$ containing sulfuric acid, phosphorus compounds, hydrogen chloride, organochlorosilanes, carboxylic acid halides, fuller's earth, ferric chloride and other Lewis acids.

5. The method of applying an extremely viscous polydimethyl siloxane to a solid surface to condition said surface for connection to another surface secure against relative movement under conditions of shock and sudden vibration, which comprises mixing siloxane consisting essentially of polydimethyl siloxane of a viscosity of less than 100,000 cst. at 20° C. selected from the group consisting of $\alpha,\omega$-dihydroxy-polydimethyl siloxanes and permethyl-cyclopolysiloxanes, and a portion of between 0.1 and 5% by weight of a catalyst for polymerization of said polydimethyl siloxane which catalyst is active at room temperature, and applying said mixture while the viscosity of the polydimethyl siloxane is as aforesaid to the surface to be coated.

6. The method of claim 5 wherein the catalyst is selected from the group consisting of sulfuric acid, $SO_3$ containing sulfuric acid, phosphorous compounds, hydrogen chloride, organochlorosilanes, carboxylic acid halides, fuller's earth, ferric chloride and other Lewis acids.

References Cited by the Examiner

UNITED STATES PATENTS

| | | | |
|---|---|---|---|
| 2,504,388 | 4/1950 | Braley | 156—329 |
| 2,690,879 | 10/1954 | Snyder | 156—82 |
| 2,928,446 | 3/1960 | James et al. | 117—137 |
| 2,985,544 | 3/1961 | Monterey et al. | 117—155 |
| 3,020,260 | 2/1962 | Nelson | 117—161 |
| 3,022,197 | 2/1962 | Jedlicka | 117—161 |

EARL M. BERGERT, *Primary Examiner.*

E. G. WHITBY, J. P. MELOCHE, *Assistant Examiners.*